(12) United States Patent
Gebele et al.

(10) Patent No.: US 6,507,039 B2
(45) Date of Patent: Jan. 14, 2003

(54) APPARATUS FOR READING INFORMATION RECORDED IN A MEMORY LAYER AND AN X-RAY CASSETTE AND X-RAY TABLE FOR USE WITH THE APPARATUS

(75) Inventors: Herbert Gebele, Sauerlach (DE); Juergen Mueller, Munich (DE); Hans Schaller, Munich (DE)

(73) Assignee: Agfa-Gevaert Aktiengesellschaft, Leverkusen (DE)

( * ) Notice: Subject to any disclaimer, the term of this patent is extended or adjusted under 35 U.S.C. 154(b) by 23 days.

(21) Appl. No.: 09/734,791

(22) Filed: Dec. 12, 2000

(65) Prior Publication Data

US 2001/0006221 A1 Jul. 5, 2001

(30) Foreign Application Priority Data

Dec. 23, 1999 (DE) .......................................... 199 62 773

(51) Int. Cl.[7] .............................. G01T 1/29; H04N 1/031
(52) U.S. Cl. ........................................ 250/584; 250/581
(58) Field of Search ................................. 250/584, 581, 250/582, 583, 585, 586, 588, 484.4, 485.1, 484.5, 369; 378/2, 22

(56) References Cited

U.S. PATENT DOCUMENTS

| 4,737,641 A | * | 4/1988 | Lange et al. ............. 250/372.2 |
| 4,771,174 A | | 9/1988 | Torii ........................ 250/327.2 |
| 4,843,241 A | | 6/1989 | Saotome et al. .......... 250/327.2 |
| 5,260,573 A | * | 11/1993 | Tsuchino ..................... 250/584 |
| 5,534,709 A | * | 7/1996 | Yoshimoto et al. .......... 250/588 |
| 5,864,146 A | * | 1/1999 | Karellas ..................... 250/581 |

FOREIGN PATENT DOCUMENTS

| EP | 0123943 | 11/1984 |
| EP | 0233495 | 8/1987 |
| EP | 0417844 | 3/1991 |
| EP | 0482676 | 4/1992 |
| EP | 0490532 | 6/1992 |
| EP | 0521497 | 1/1993 |
| WO | 9928765 | 6/1999 |

* cited by examiner

Primary Examiner—Constantine Hannaher
Assistant Examiner—Otilia Gabor
(74) Attorney, Agent, or Firm—Milde & Hoffberg, LLP

(57) ABSTRACT

Apparatus for reading information stored in a memory layer (15) which includes a shielding device (22), and an X-ray cassette and an X-ray table for use with the apparatus, are disclosed. The shielding device (22) serves to shield a reader device (10) from an information recording beam (25). The reader device (10) includes a receptor (12) to receive emission radiation (17) that contains an image of the information recorded in the memory layer (15). Instead of the shielding device (22), it is also possible to provide a converter (29) that serves to convert an information-recording beam (25) into converted radiation (28) that possesses less energy than the information recording beam (25).

8 Claims, 4 Drawing Sheets

APPARATUS FOR READING INFORMATION RECORDED IN A MEMORY LAYER AND AN X-RAY CASSETTE AND X-RAY TABLE FOR USE WITH THE APPARATUS

BACKGROUND OF THE INVENTION

The present invention relates to apparatus for reading information recorded in a memory layer, such as an X-ray memory layer and an X-ray cassette and X-ray table for use with the apparatus.

Particularly for medical purposes, an image of an object (such as a patient) is created using X-ray radiation that is recorded in a memory layer as a latent image. A phosphor film base is often used for this memory layer. In order to read the X-ray image recorded in the memory layer, the memory layer is excited using a radiation source. Because of this excitation, the memory layer radiates light of an intensity corresponding to the recorded X-ray image. The light emitted from the memory layer is received by a receptor and eventually converted into electrical signals so that the X-ray image recorded in the memory layer may then be made visible. The X-ray image may, for example, be displayed directly on a monitor or printed onto a special X-ray film suitable for X-ray images.

Such a device used to read out information recorded in a memory layer is known, for example, from published International Patent Application No. WO 99/28765. In this known device, the memory layer is excited by rows by an exciter beam that is created by a radiation source. This radiation source may be a laser diode strip, for example. The light emitted because of excitation of the memory layer is received by a receptor. For this purpose, the receptor contains a number of light-sensitive surfaces that are arranged in adjacent rows. The radiation emitted from the memory layer is received by the light-sensitive surfaces. The receptor may be a Charge-Coupled Device (CCD) that contains a number of photo-detectors arranged in adjacent rows.

In order to read the information recorded in the memory layer, the radiation source and receptor are moved over the memory layer by means of a linear motor.

SUMMARY OF THE INVENTION

Based on the principle advanced by the aforementioned publication No. WO 99/28765, the principal objective of the present invention is to provide a simple and effective means to improve the quality of reproducing information recorded in a memory layer.

This objective, as well as other objectives which will become apparent from the discussion that follows, are achieved, in accordance with the present invention, by providing apparatus for reading information stored in a memory layer which includes a reader device having a receptor to receive emission radiation that contains an image of the information recording on the memory layer. The apparatus also includes a shielding device, which serves to shield the reader device from an information recording beam. Alternatively or additionally, it is possible to provide a converter that serves to convert an information recording beam into converted radiation that possesses less energy than the information recording beam.

As a result of the invention, impact of high-energy storage radiation on the reader may be avoided. The reader contains semiconductor components that are sensitive to the energy-rich recording radiation. As a result of the invention, it is possible to prevent, or at least reduce, the formation of grid error points within these semiconductor components. Such grid error points can cause alteration of the specific characteristics of the semiconductor components after cumulative irradiation from the recording beam. Specific characteristics of these semiconductor components may be altered by increasing levels of radiation exposure frequency by means of recording radiation. Aging symptoms may appear in these semiconductor components that then may lead to a negative effect on image quality during reproduction of the information recorded. The signal-to-noise ratio during reproduction of the information recorded is worsened. This is prevented by the invention.

In an advantageous embodiment of the invention, the shielding device that shields the reader from storage radiation contains lead in order to prevent impact of the recording radiation on the reader. This allows shielding mainly against X-rays used as recording radiation in a simple and effective manner.

In a further advantageous embodiment of the invention, the converter according to the invention used to convert the recording radiation into a beam that is of reduced energy with respect to its energy content also performs a wavelength conversion. Thus, for example, an X-ray beam may be transformed into a wavelength band that is located within the visible spectrum, particularly in the blue or ultra-violet range.

In a further particularly advantageous embodiment of the invention, the shielding device or conversion device is arranged above the resting position of the reader. Thus, the size of the shielding device or conversion device may be limited. Further, a fixed position is assigned to the shielding device or conversion device within the apparatus according to the invention. It is thereby ensured that the reader is protected from the high-energy recording beam during downloading of information in the memory layer.

Advantageously the reader device, shielded by the shielding device or conversion device, also contains a radiation source to excite the memory layer. This radiation source with the receptor is therefore simultaneously shielded from the recording beam.

For a full understanding of the present invention, reference should now be made to the following detailed description of the preferred embodiments of the invention as illustrated in the accompanying drawings.

DESCRIPTION OF THE PREFERRED EMBODIMENT

Figure 1:
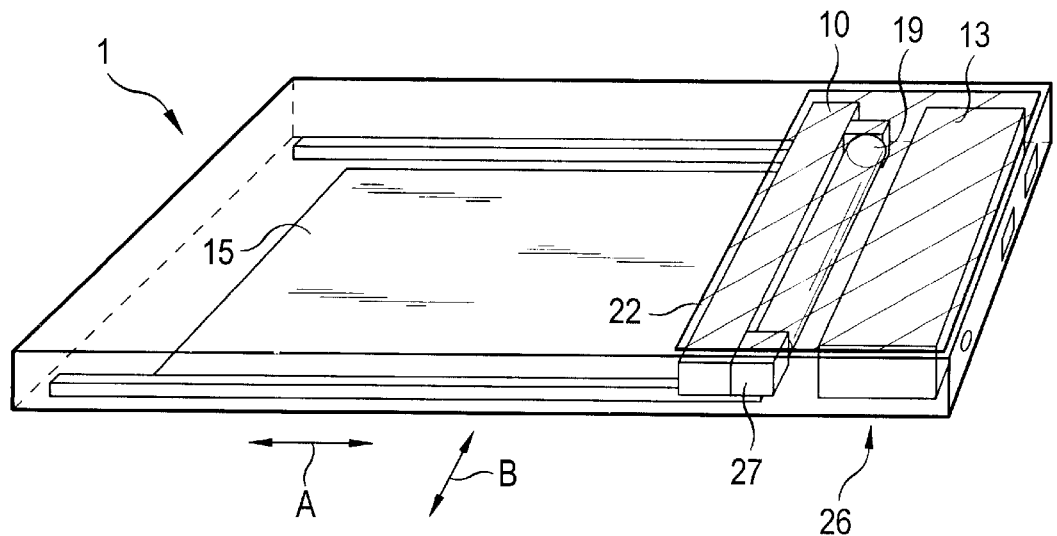
FIG. 1 is a perspective, phantom view of a preferred embodiment of the X-ray cassette based on the invention.

The preferred embodiments of the present invention will now be described with reference to FIGS. 1–5 of the drawings. Identical elements in the various figures are designated with the same reference numerals.

FIG. 1 shows a preferred embodiment of an X-ray cassette 1. This X-ray cassette 1 contains a memory layer 15. The memory layer 15 here is a phosphor plate. X-ray radiation images may be recorded within the phosphor plate 15. The X-ray cassette 1 contains a reader head 10 used to read the X-ray radiation images recorded in the phosphor plate 15. The reader head 10 may be transported over the surface of the phosphor plate 15 in direction A along two guide rails using a drive 27. The drive 27 may be a linear motor, for example. A deleting lamp 19 is mounted behind the reader head 10. The deleting lamp 19 is firmly connected to the reader head 10, and can be transported over the surface of the phosphor plate 15 in direction A with reader head 10. The deleting lamp 19 serves to erase the information stored in the phosphor plate 15 that remains stored within the phosphor plate 15 after the reader head 10 reads the X-ray radiation image. The deleting lamp 19 and the reader head 10 extend along direction B across the entire width of the phosphor plate 15. The row direction B is perpendicular to movement direction A.

The X-ray cassette 1 further contains a control device 13 by means of which the components within the X-ray cassette 1 may be controlled. The reader head 10, the deleting lamp 19, and the control device 13 are arranged within the X-ray cassette to the right, adjacent to the phosphor plate 15, as shown in FIG. 1. The reader head 10, the deleting lamp 19, and the control device 13 are shown in the rest position 26. In this rest position 26, the reader head 10 and the deleting lamp 19 are not propelled across the surface of the phosphor plate 15 by the drive 27. A shielding device 22 is located above the rest position 26. In this embodiment, the shielding device 22 is a lead shield. The reader head 10, the deleting lamp 19, and the control device 13 are shielded from X-rays directed toward the X-ray cassette 1 by means of this lead shielding device 22. The lead shield 22 blocks such X-ray radiation. The lead shield 22 is firmly attached to the upper side (cover) of the housing of the X-ray cassette 1. It is also possible not to connect the lead shield 22 to the housing of the X-ray cassette 1, but rather to the transportable unit containing the reader head 10, the deleting lamp 19, and the control device 13. The control device 13 may be firmly fixed within the X-ray cassette 1. It is not necessary that the control device 13 be transported across the surface of the phosphor plate 15 along with the reader head 10 and the deleting lamp 19 by means of the drive 27. Suitable wire connection between the control device 13 on the one end and the reader head 10 and the deleting lamp 19 on the other would allow control of the reader head 10 and the deleting lamp 19 if a readout of the information stored within the phosphor layer 15 results.

Instead of the lead shielding 22, other materials may also be used to shield the reader head 10, the deleting lamp 19, and the control device 13. It is possible to employ a conversion device instead of the shielding device 22 by means of which the high-energy recording beam (X-ray radiation) is reduced in energy.

Figure 2:
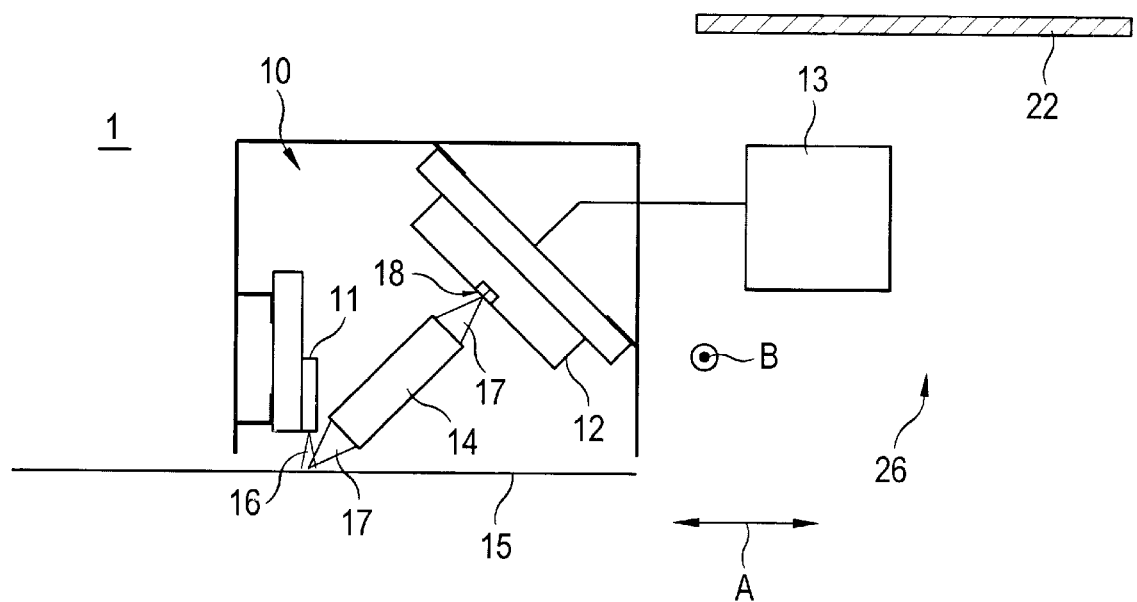
FIG. 2 is a schematic representation of the preferred embodiment of the X-ray cassette during readout of recorded information.

FIG. 2 shows a more detailed view of the X-ray cassette 1 shown in FIG. 1. This shows a reader head 10 that contains a radiation source 11. The radiation source 11 here is a strip of laser diodes with a number of adjacent laser diodes. The strip of laser diodes 11 may produce excitation radiation 16 that serves to excite the phosphor plate 15. In this embodiment, the phosphor plate 15 is configured in rows. The phosphor plate 15 emits an emission radiation 17 because of the excitation radiation 16. This emission radiation 17 is displayed by an optical projection device 14 (that may contain micro-lenses, for example) onto a CCD row 12. The CCD row 12 contains a number of adjacent light-sensitive surfaces 10. Thus, an image of the information stored in a row of the phosphor plate 15 may be detected by the CCD row 12 and converted into electrical signals. These signals created by the CCD row 12 are forwarded to the control device 13 that is connected with the reader head 10 and particularly with the CCD row 12 for this purpose.

In the embodiment according to FIG. 2, the reader head 10 is driven by the drive 27 in order to read the information stored in the phosphor plate 15. As shown in FIG. 2, the reader head 10 is not located at its rest position 26. Instead, the reader head 10 is located to the left of the rest position 26 that is shielded by the lead shield 22. New information is not simultaneously recorded into the phosphor plate 15 during reading of the information stored in the phosphor plate 15.

Figure 3:
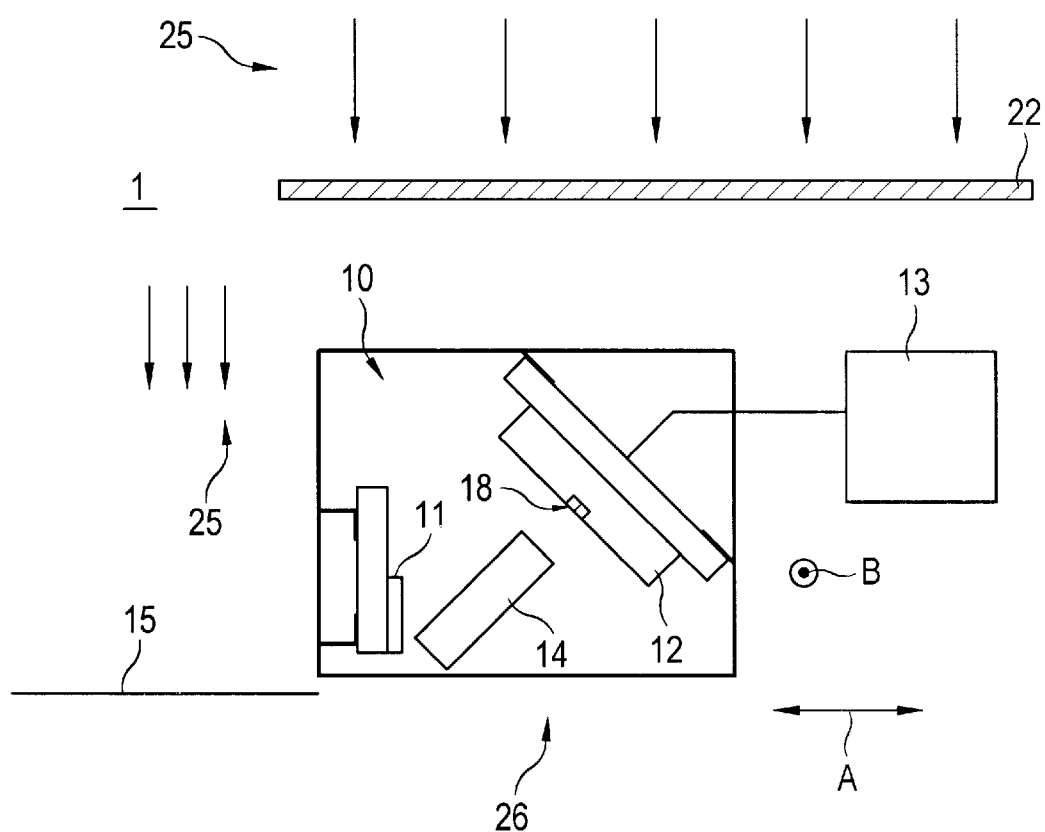
FIG. 3 is a further schematic representation of the preferred embodiment of the X-ray cassette during recording of an X-ray radiation image.

FIG. 3 shows the aforementioned embodiment of the X-ray cassette 1 according to the invention during the storage of information in the phosphor plate 15. For this purpose, an X-ray beam 25 from an X-ray radiation source (not shown) is emitted in the direction of the X-ray cassette. This X-ray beam 25 basically impacts on the overall extent of the X-ray cassette 1. The function of the lead shield 22 is clear from the example shown in FIG. 3. The X-ray beam 25 striking the lead shield 22 is deflected, and thus cannot strike the reader head 10 and the control device 13. The high-energy X-ray beam 25 does not irradiate the components within the reader head 10 and the control device 13.

Figure 4:
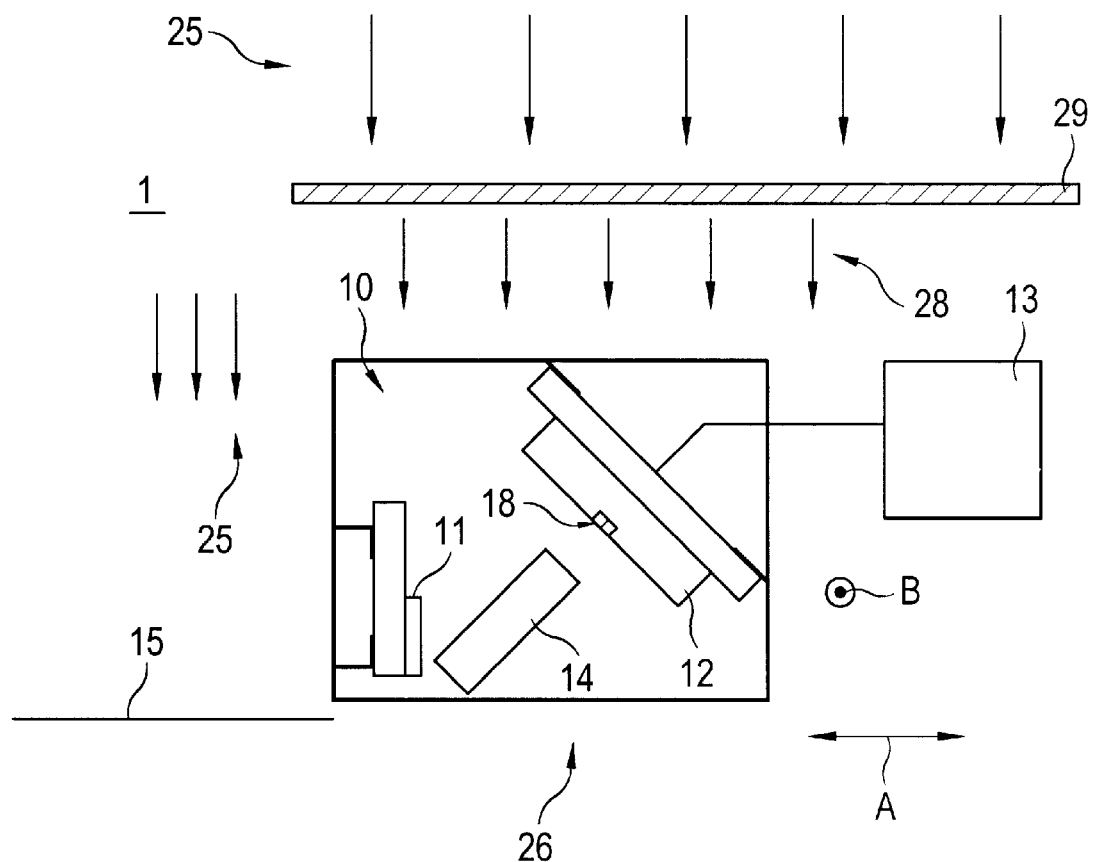
FIG. 4 is a schematic representation of another preferred embodiment of the X-ray cassette based on the invention with a conversion device during irradiation.

FIG. 4 shows another embodiment of the X-ray cassette 1 according to the invention. Instead of the lead shield 22, the X-ray cassette 1 here contains a conversion device 29. This device 29 converts the X-ray beam 25 into a converted radiation 28. The converted radiation 28 has an energy level that is markedly lower than that of the X-ray beam 25. The conversion device 29 may, for example, be a so-called scintillation layer as is known from the German Patent No. DE 195 05 729 C1. Such a scintillation layer 29 can transform the wavelength of the excitation beam 25. The wavelength of the converted radiation 28 is approximately in the blue or ultra-violet range of the visible spectrum because of the wavelength energy transformation performed by the conversion device 29.

Figure 5:
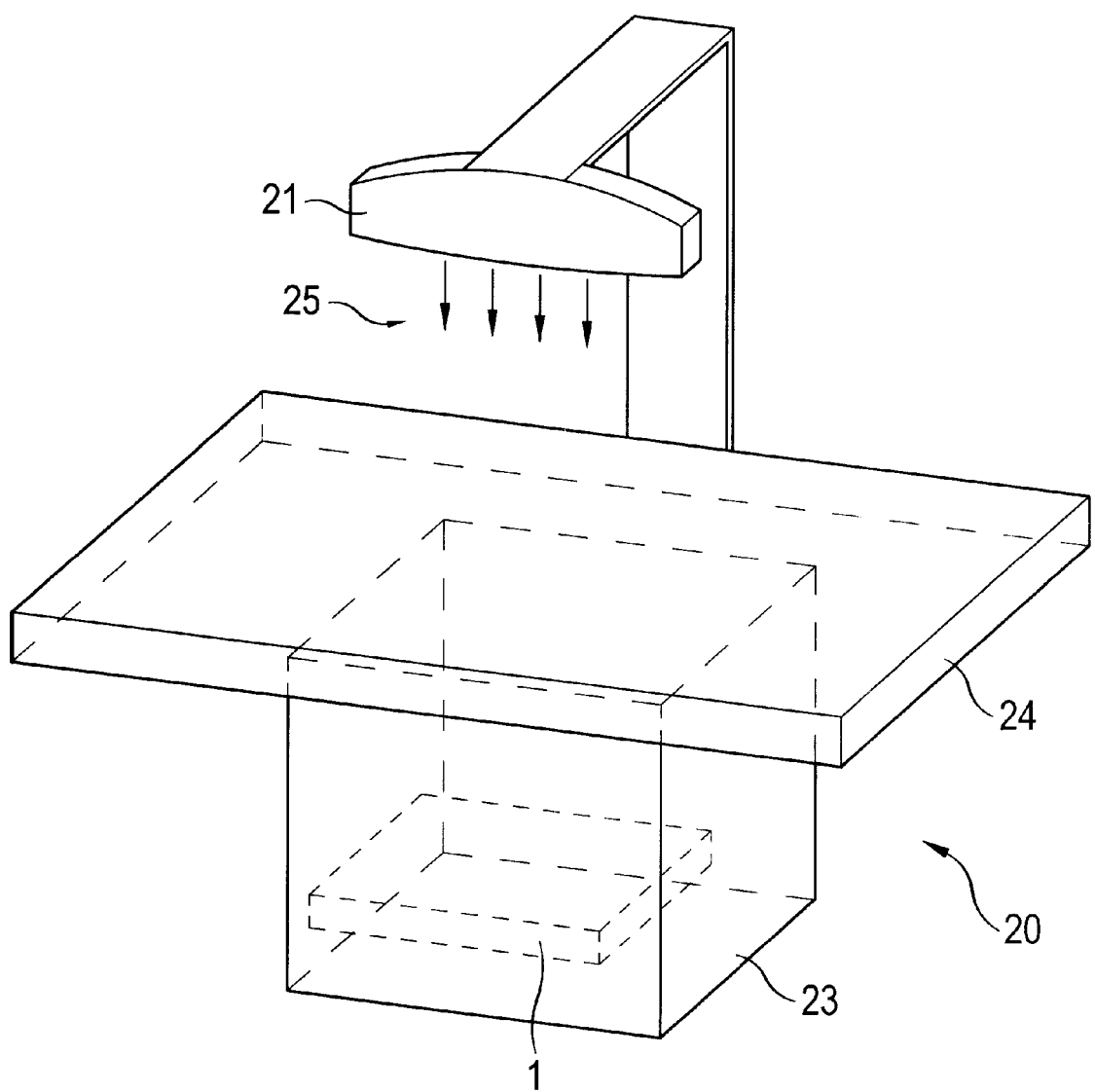
FIG. 5 is a preferred embodiment of the X-ray table with an X-ray cassette.

FIG. 5 shows a preferred embodiment of an X-ray table 20 into which the X-ray cassette 1 previously described is inserted. The X-ray table 20 contains an X-ray base 23 in which the X-ray cassette 1 is located, and a supporting surface 24 positioned on the X-ray base 23. Patients are positioned on this supporting surface 24 for X-ray exposures. An X-ray source 21 is positioned above the X-ray table 20 with the supporting surface 24 and the X-ray base 23 containing the X-ray cassette 1. The X-ray source 21 emits the X-ray beam 25 toward the supporting surface 24 to record the X-ray image.

There has thus been shown and described a novel apparatus for reading information recorded in a memory layer and an X-ray cassette and X-ray table for use with the apparatus which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. X-ray cassette apparatus having a memory layer for reading information that has been stored in the memory layer by means of an X-ray recording beam produced by an X-ray source, said cassette apparatus comprising:

(a) a reader device operative to scan the memory layer and including a receptor for receiving the radiation that is emitted from the memory layer as a result of excitation from an excitation beam;

(b) transport device for moving the reader device with respect to the memory layer in order to scan the memory layer and read the stored information, said transport device holding said reader device in a rest position, when the reader device is not scanning, which is outside the path of the recording beam from the X-ray source to the memory layer; and (c) a shielding device, disposed between the X-ray source and the rest position, for shielding the reader device from the recording beam.

2. The apparatus recited in claim 1, wherein the shielding device contains lead.

3. The apparatus recited in claim 1, wherein the reader device includes a radiation source to create the excitation beam.

4. The apparatus recited in claim 3, wherein the radiation source is so configured that it excites one row of the memory layer at a time, and wherein the receptor includes a number of light-sensitive surfaces that are arranged adjacently.

5. X-ray cassette apparatus having a memory layer for reading information that has been stored in the memory layer by means of an X-ray recording beam produced by an X-ray source, said cassette apparatus comprising:

(a) a reader device operative to scan the memory layer and including a receptor for receiving the radiation that is emitted from the memory layer as a result of excitation from an excitation beam;

(b) transport device for moving the reader device with respect to the memory layer in order to scan the memory layer and read the stored information, said transport device holding said reader device in a rest position, when the reader device is not scanning, which is outside the path of the recording beam from the X-ray source to the memory layer; and (c) a conversion device, disposed between the X-ray source and said reader device, for converting the recording beam, that has a first energy level, into a converted radiation having a second energy level, the second energy level being lower than the first energy level.

6. The apparatus recited in claim 5, wherein the conversion device is operative to perform a wavelength conversion.

7. The apparatus recited in claim 5, wherein the reader device includes a radiation source to create the excitation beam.

8. The apparatus recited in claim 7, wherein the radiation source is so configured that it excites one row of the memory layer at a time, and wherein the receptor includes a number of light-sensitive surfaces that are arranged adjacently.

* * * * *